Patented Jan. 17, 1933

1,894,934

UNITED STATES PATENT OFFICE

JOHN MORRIS WEISS, OF NEW YORK, N. Y.

PRODUCTION OF RESINS OF THE COUMARONE-INDENE TYPE

No Drawing.   Application filed July 10, 1929.   Serial No. 377,347.

This invention relates to the production of resins by the polymerization of such polymerizable compounds as coumarone, indene, etc. and has for its object the production of such resins in a relatively pure state of light color and in a rapid and economical manner.

It is well known that aromatic naphthas such as coal tar naphtha, water gas tar naphtha or gas drips naphtha and the like, distilling between 150° and 200° C. contain appreciable quantities of coumarone, indene and similar compounds, which are capable of being polymerized by various polymerizing agents to form resins, such resins being usually termed paracoumarone resins. Various polymerizing agents such as concentrated sulphuric acid, anhydrous stannic chloride or anhydrous aluminum chloride may be used to bring about this resin formation, but, up to now, concentrated sulphuric acid has been the material almost universally used in commercial practice. The process as usually carried out consists in adding concentrated sulphuric acid of about 93% strength very slowly to the solvent naphtha, the mixture being violently agitated by efficient agitators. The reaction with concentrated sulphuric acid is very energetic and difficult to control because of the large amount of heat liberated during the polymerization which with sulphuric acid is almost instantaneous when mixing is accomplished. Efficient means for cooling must be provided to prevent the temperature from rising too high. In fact in some processes artificial refrigeration is used to keep the mass below 0° C. during the reaction. After the polymerization has been completed the mixture is allowed to stand for a long time in order to permit the settling out of the acid sludge and also of the considerable quantity of tarry matter formed in the reaction; the acid layer along with the tar is finally run off and the naphtha layer containing the polymerized coumarone and indene in solution is neutralized with an alkaline solution, the latter separated after settling, the naphtha layer then washed to remove the alkali and finally subjected to steam disillation with or without vacuum, as desired, to remove the unpolymerized portion of the solvent naphtha and heavy polymers of oily nature. The residue remaining in the still constitutes the finished resin in liquid form, and on cooling solidifies to a solid mass, the melting point dependent on the extent to which the distillation has been carried. Unless special precautions are taken in the acid polymerization, dark colored nearly opaque resins result. A preliminary wash with a small amount of acid has been used by some to remove tarry materials before the final polymerization. In the best practice also, great care is taken in regulating the temperature of polymerization and keeping it low. All this has been necessary to produce a clear, light colored, high grade product suitable for use as a varnish resin in high grade varnishes.

By my invention which I shall presently describe, the process of producing these high grade resins is greatly simplified in that the polymerization reaction is easily and smoothly brought about with little or no refrigeration and the recovery of the resin is more easily and quickly accomplished. The quality of the resin is high grade in that it is light colored and easily obtained with a high melting point, even without a preliminary light acid wash although with some crudes this may be advisable.

I have discovered a new and very effective polymerizing agent to be used in place of the concentrated sulphuric acid heretofore employed in practice for the polymerization of coumarone, indene and their homologs normally occurring in solvent naphtha. This new polymerizing agent comprises essentially a mixture of iron oxide, absorbent earth such as fuller's earth, and sulphuric acid in excess of that needed to form ferric sulphate, which I prepare by thoroughly incorporating concentrated sulphuric acid in a mixture of ferric oxide and the earth, after which the mass is dried and powdered to a size of about 20–30 mesh to the inch and is then in a form suitable for the production of paracoumarone resins. The finished product is considered as an acid ferric sulphate in mixture with absorbent earth, and is so designated in the claims, the term "acid ferric sulphate" being intended to mean that an excess of acid is present but I do not limit myself to any exact excess. It is further understood that I do not wish to be limited to the composition given above as I have found that this may be varied over wide limits. I have further found that the two solid materials specified above may be substituted by a variety of materials possessing similar chemical and physical characteristics. For example, the iron oxide may be substituted wholly or in part by other oxides which give strongly acid sulphates such as aluminum oxide. The fuller's earth may be replaced wholly or in part by other highly absorbent and porous materials such as bentonite, kieselguhr, various clays and substances of similar physical properties. In every case, however, the sulphuric acid shall be in excess of that required to form the neutral salt of the oxide employed.

The iron oxide used should be a ferric oxide and preferably one which has been precipitated or water deposited. If it contains ferrous oxide it is desirable to add enough nitric acid to the mixture to oxidize the ferrous iron to the ferric state.

To illustrate the manner in which this new polymerization agent is employed for the polymerization of coumarone, indene and similar compounds the following example is given:

One-half pound of the dry powdered polymerizing agent comprising, for example, ferric oxide, fuller's earth and sulphuric acid in excess of the amount necessary to form ferric sulphate is used for each gallon of crude coal tar solvent naphtha having a boiling range of substantially from 160° to 190° C. The solvent naphtha and the reagent are vigorously agitated for two hours at a temperature of about 55° C. or higher after which the mass is filtered. Due to the porosity of the polymerizing agent the filtration is very rapid and the tarry matter formed is held back on the filter along with the spent reagent. The filtered naphtha containing the polymerized coumarone, indene, etc. in solution, is then washed with a dilute alkaline solution to remove acid and finally with water to remove any residual alkali present. The resins are recovered by distilling off the unpolymerized portion of the solvent naphtha using steam distillation with or without vacuum whereupon the resin remains behind in the still as liquid which solidifies on cooling. For the hardest grade of resin vacuum distillation with live superheated steam is advantageous.

It is understood that the example just given is only for the purpose of illustrating a convenient manner in which this new polymerizing agent may be made and used. Various treatments may be given to the solvent naphtha solution both before and after polymerization, as, for example, the solvent naphtha may be given an acid wash with 50° Bé. sulphuric acid just prior to the use of my polymerizing agent, or the alkali and water washing after the separation of the polymerizing agent may be varied in any desired manner and the distillation of the unpolymerized solvent naphtha to recover the resin may also be varied and carried out in other ways. The temperature of treatment with reagent may be varied over broad limits from very low temperatures up to 150° C. or even higher. Some of the advantages of this new polymerizing agent may be noted as follows: The addition of the polymerizing agent is very simple as compared with the necessary gradual addition of sulphuric acid when the latter is used as the polymerizing agent since the reaction is very gradual and there is no tendency toward superheating. This is because the heat of reaction is spread over a longer period of time and the polymerization is essentially less vigorous. The removal of the polymerizing agent together with the tarry matter is readily accomplished in contradistinction to the old sulphuric acid polymerization which requires a long period of time for the settling out of the acid sludge and thick tarry matter and which in some cases cannot be removed. The adsorption of the dark colored byproducts from the polymerization by the fuller's earth or other earthy carrier, gives a lighter colored finished resin. There is less formation of tarry material than when sulphuric acid is used, since this reagent does not attack the unsaturated hydrocarbons to nearly the extent which sulphuric acid does. The spent reagent can be disposed of without nuisance in contradistinction to the ordinary acid tar which in many cases requires special disposal means to avoid nuisance.

The amount of the reagent required varies with the type of crude handled, the content of polymerizable compounds, the temperature of operation, the excess of acid used in making the reagent, etc.

Having thus described the invention, I claim:

1. In the polymerization of bodies of the type of coumarone and indene, the use as a polymerizing agent of a mixture of an absorbent earth and an acid ferric sulphate.

2. In the polymerization of bodies of the type of coumarone and indene, the use as a polymerizing agent of a mixture of fuller's earth, and an acid ferric sulphate.

3. In the polymerization of bodies of the type of coumarone and indene contained in coal tar naphtha, the use as a polymerizing agent of a mixture of fuller's earth, and an acid ferric sulphate.

4. The production of paracoumarone resin comprising mixing naphtha, containing bodies of the type of coumarone and indene, with a mixture of an absorbent earth and an acid ferric sulphate.

5. The production of paracoumarone resin comprising mixing naphtha, containing bodies of the type of coumarone and indene, with a mixture of fuller's earth and an acid ferric sulphate.

6. The production of paracoumarone resin comprising mixing naphtha, containing bodies of the type of coumarone and indene, with a mixture of fuller's earth and an acid ferric sulphate, and filtering off the reagent.

7. The production of paracoumarone resin comprising mixing naphtha, containing bodies of the type of coumarone and indene, with a mixture of fuller's earth and an acid ferric sulphate, filtering off the reagent and washing the naphtha with alkali.

8. The production of paracoumarone resin comprising mixing naphtha, containing bodies of the type of coumarone and indene, with a mixture of fuller's earth and an acid ferric sulphate, filtering off the reagent and washing the naphtha with alkali and water.

9. The production of paracoumarone resin comprising mixing naphtha, containing bodies of the type of coumarone and indene, with a mixture of fuller's earth and an acid ferric sulphate, filtering off the reagent, washing the naphtha with alkali and water, and removing unpolymerized naphtha by distillation.

10. The production of paracoumarone resin comprising mixing coal tar naphtha with a mixture of an absorbent earth and an acid ferric sulphate.

11. The production of paracoumarone resin comprising mixing coal tar naphtha with a mixture of fuller's earth and an acid ferric sulphate.

12. The production of paracoumarone resin comprising mixing coal tar naphtha with a mixture of fuller's earth and an acid ferric sulphate, filtering off the reagent and recovering paracoumarone resin from the filtrate.

13. The production of paracoumarone resin comprising mixing coal tar naphtha with a mixture of an absorbent earth and an acid ferric sulphate at a temperature below 150° C.

14. The production of paracoumarone resin comprising mixing coal tar naphtha having a boiling point range within the limits 150° C. to 200° C. with a mixture of an absorbent earth and an acid ferric sulphate.

15. The production of paracoumarone resin comprising washing coal tar naphtha to remove impurities and subsequently mixing the purified naphtha with a mixture of an absorbent earth and an acid ferric sulphate.

In testimony whereof, I hereby affix my signature.

JOHN MORRIS WEISS.